United States Patent

Kobayashi et al.

Patent Number: 5,965,640
Date of Patent: Oct. 12, 1999

[54] ACRYLIC RUBBER COMPOSITION

[75] Inventors: Nobutoshi Kobayashi; Minoru Tanaka, both of Tokyo, Japan

[73] Assignee: JSR Corporation, Tokyo, Japan

[21] Appl. No.: 08/869,776

[22] Filed: Jun. 5, 1997

[30] Foreign Application Priority Data

Jun. 6, 1996 [JP] Japan .................................. 8-165088

[51] Int. Cl.[6] ............... C08K 5/40; C08K 5/54; C08K 5/57; C08K 13/02
[52] U.S. Cl. ............... 524/81; 524/86; 524/201; 524/210; 524/287; 524/430; 524/436; 524/437
[58] Field of Search ............... 524/556, 81, 86, 524/201, 210, 487, 430, 436, 437; 525/176

[56] References Cited

U.S. PATENT DOCUMENTS

| 4,569,958 | 2/1986 | Maeda et al. ................. 524/100 |
| 5,164,442 | 11/1992 | Itoh et al. . | |

FOREIGN PATENT DOCUMENTS

| 80039181 | of 1980 | Japan . |
| 58-180539 | of 1983 | Japan . |
| 2150409 | of 1990 | Japan . |
| 5320456 | of 1993 | Japan . |
| 93082413 | of 1993 | Japan . |
| 7228746 | of 1995 | Japan . |

OTHER PUBLICATIONS

Nisshin Chemical, WPIDS AN 95–332–646, abstracting JP 07228746, Aug. 1995.
Patent Abstracts of Japan, vol. 011, No. 008 (C–396), Jan. 9, 1987, & JP 61 185543 A (NOK Corp), Aug. 19 1986, Abstract.
Patent Abstracts of Japan, vol. 014, No. 403 (C–0753), Aug. 31, 1990 & JP 02 150409 A (Tosoh Corp), Jun. 8, 1990, Abstract.

*Primary Examiner*—Jeffrey C. Mullis
*Attorney, Agent, or Firm*—Oblon, Spivak, McClelland, Maier & Neustadt, P.C.

[57] ABSTRACT

A crosslinkable acrylic rubber composition exhibiting superior balance between the storage stability and cure rate, and having only minimal risk of corroding metals or being contaminated by metals. The cured products made from the composition have excellent tensile strength, permanent compression set, and water resistance. The composition which comprises (1) a halogen-containing acrylic rubber, (2) a triazine thiol compound, (3) a dithiocarbamine acid derivative or a thiuram sulfide compound, or both, (4) a hydrotalcite compound or an organotin compound, or both, (5) an aromatic carboxylic acid compound or an acid anhydride thereof, or both, (6) a white filler with a pH of 2–10, and (7) a silane coupling agent.

8 Claims, 2 Drawing Sheets

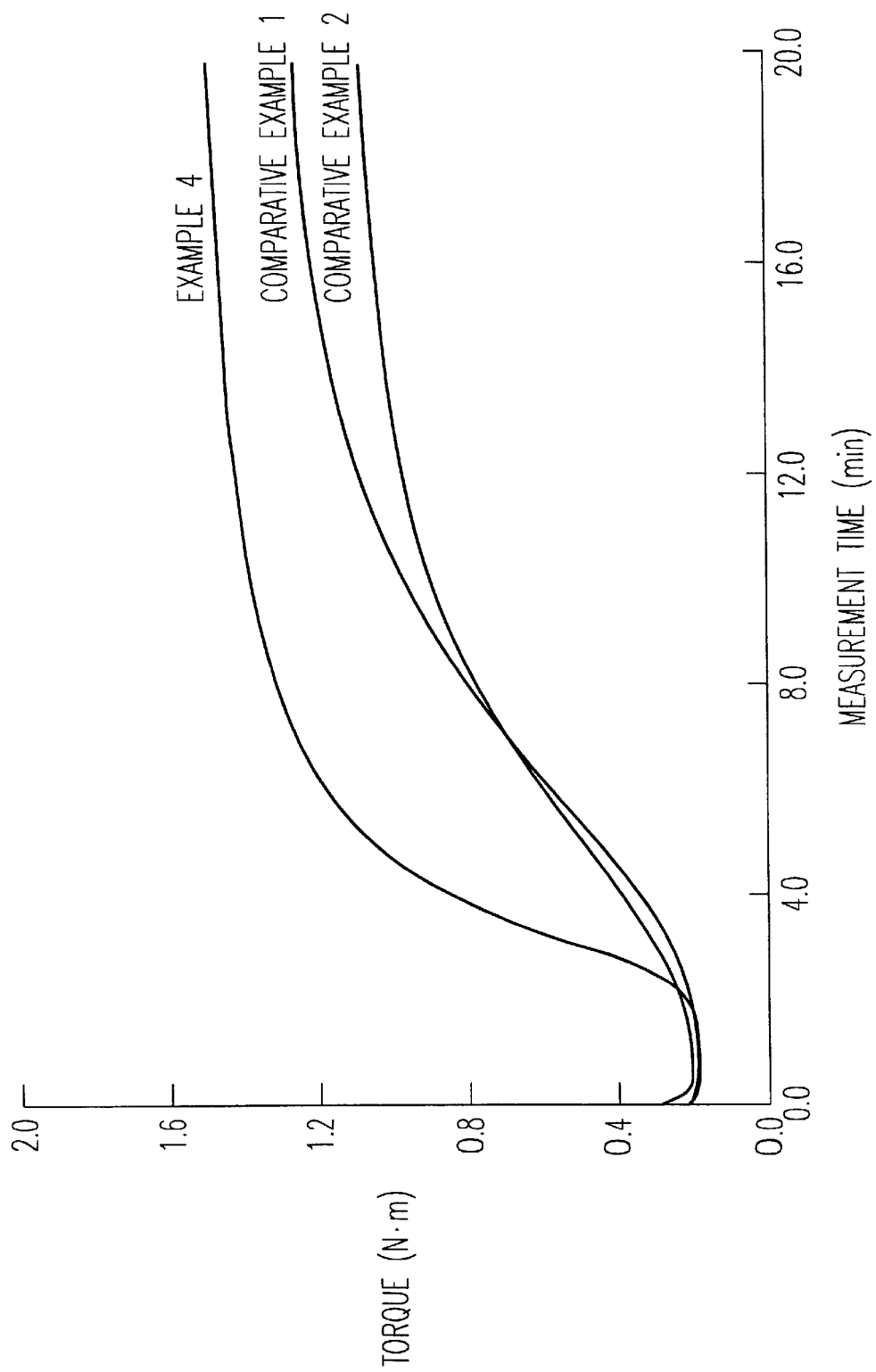

ACRYLIC RUBBER COMPOSITION

BACKGROUND OF THE INVENTION

1. Field of the Invention

The present invention relates to a crosslinkable acrylic rubber composition exhibiting a superior balance between the storage stability and cure rate, and having only minimal risk of corroding metals or being contaminated by metals.

2. Description of the Background Art

Acrylic rubber is an elastomer (co)polymer containing alkyl acrylate and/or alkoxyalkyl acrylate as principal components. The acrylic rubber has excellent oil resistance, heat resistance, weather resistance, ozone-proof properties, and permanent compression set, and the like. Rubber compositions containing this rubber have conventionally been used as sealing materials such as packing and gasket, and various molded articles.

Such an acrylic rubber possesses cure sites such as, for example, halogen-type cure sites, epoxy-type cure sites, and diene-type cure sites. An appropriate crosslinking agent or crosslinking accelerator corresponding to the type of cure site is added when the rubber composition is prepared.

Particularly, as crosslinking agents for a halogen-containing acrylic rubber, a composition comprising a fatty acid metal soap and sulfur or a sulfur donor, a composition comprising a triazine derivative and a dithiocarbamine acid derivative, and the like are known. Of these, the crosslinking agent comprising a fatty acid metal soap is inferior in the rate of crosslinking, permanent compression set, and water resistance; the crosslinking agent containing triazine derivative also exhibits only an insufficient rate of crosslinking, anti-scorching properties, and storage stability. Moreover, metal corrosion and metal contamination during crosslinking are problems with the crosslinking agent containing triazine derivative.

To solve these problems, Japanese Patent Publication No. 39181/1980, for example, proposed a composition comprising 1̂ an alkali metal salt of an organic carboxylic acid, 2̂ sulfur or a sulfur donor, and 3̂ an urea compound, a thiourea compound, an imidazoline compound, or an amino acid compound. This crosslinking agent, however, exhibits only a retarded rate of crosslinking and involves permanent compression set.

There is also some prior art disclosing triazine derivative-containing crosslinking agents. For example, Japanese Patent Application Laid-open No. 180539/1983 discloses a crosslinking agent which comprises 1̂ trithiocyanuric acid and 2̂ an alkali metal salt organic carboxylic acid. Japanese Patent Application Laid-open No. 320456/1993 discloses a composition containing 1̂ triazine thiol compound, 2̂ a quaternary ammonium salt, and 3̂ an alkali metal salt of carboxylic acid, and a composition containing a a reaction product of a triazine thiol compound and a quaternary ammonium salt. These crosslinking agents, however, are also inadequate in respect of storage stability, anti-scorching properties, rate of crosslinking, and the like. A method for improving anti-scorching properties of a halogen-containing rubber composition which comprises a triazine thrithiol crosslinking agent by adding a reinforcer and/or a filler with a pH of about 2–7 has been disclosed by Japanese Patent Publication No. 82413/1993. This composition cannot exhibit a satisfactory rate of crosslinking.

In addition, with regard to prevention of metal corrosion during cross-linking, a method of adding a hydrotalcite to a halogen-containing acrylic rubber (for example, Japanese Patent Application Laid-open No. 150409/1990) and a method of adding a silica-based reinforcing filler and a hydrotalcite to a halogen containing acrylic rubber (for example, Japanese Patent Application Laid-open No. 228746/1995) have been proposed. These rubber compositions, however, are also inadequate in respect of the balance between the storage stability and the rate of crosslinking.

Any conventional halogen-containing acrylic rubber compositions thus have not reached a satisfactory level in terms of well balanced characteristics such as storage stability, rate of crosslinking, permanent compression set, metal corrosion, metal contamination, and the like.

The present invention has been achieved in view of these problems in the conventional technology and has an object of providing a crosslinkable halogen-containing acrylic rubber composition exhibiting superior balance between the storage stability and rate of crosslinking, free from the risks of metal corrosion and metal contamination, and exhibiting superior tensile strength, permanent compression set, water resistance, and the like.

SUMMARY OF THE INVENTION

Accordingly, a specific object of the present invention is to provide a crosslinkable acrylic rubber composition which comprises, (1) a halogen-containing acrylic rubber, (2) a triazine thiol compound, (3) a dithiocarbamine acid derivative or a thiuram sulfide compound, or both, (4) a hydrotalcite compound or an organotin compound, or both, (5) an aromatic carboxylic acid compound or an acid anhydride thereof, or both, (6) a white filler with a pH of 2–10, and (7) a silane coupling agent.

Another specific object of the present invention is to provide a crosslinkable acrylic rubber composition which is prepared by blending:

(A) a mixture prepared by blending (8) an acrylate polymer containing alkyl acrylate or alkoxyalkyl acrylate, or both, as major components (excluding a crosslinking group-containing acrylic rubber) and either or both of the above component (2) and component (4);

(B) the above components (1), (3), (5), (6), and (7); and (C) balance of the above component (2) or component (4), or both which are not blended in the above mixture (A).

Other and further objects, features and advantages of the present invention will appear more fully from the following description.

BRIEF DESCRIPTION OF THE DRAWINGS

FIG. 1 shows curast curves obtained in the curast tests in Example 4, Comparative Example 1, and Comparative Example 2.

Figure 2C:
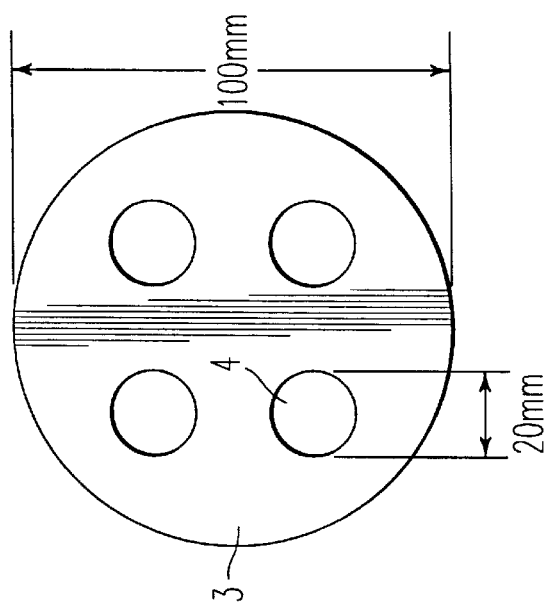
FIG. 2 shows a jig used for the metal contamination test in the Examples and Comparative Examples, configuration of a test specimen, and arrangement of the test specimen in relation to the jig.

DETAIL DESCRIPTION OF THE INVENTION AND PREFERRED EMBODIMENTS (1) Halogen-containing acrylic rubber The halogen-containing acrylic rubber in the present invention is a polymer of a copolymer in the form of an elastomer containing an alkyl acrylate or an alkoxyalkyl acrylate, or both, as major components, and halogen-based cure sites.

In the present invention, halogen-based cure sites in the halogen-containing acrylic rubber are introduced preferably by copolymerizing a monomer containing an active halogen atom which can take part in the crosslinking reaction (hereinafter referred to as halogen-containing monomer) and an alkyl acrylate and/or alkoxyalkyl acrylate. When the (co)polymer containing alkyl acrylate and/or alkoxyalkyl acrylate as major components does not contain an active halogen atom, that is, for example, when the copolymer is made from only alkyl acrylate and/or alkoxyalkyl acrylate or made by the copolymerization of these acrylates and other monomer which does not contain a halogen atom which can take part in a crosslinking reaction, it is possible to introduce the halogen-based cure sites by halogenation of these (co) polymers. A chlorine atom is particularly preferred as the halogen-based cure site in the present invention. The halogen-containing acrylic rubber in the present invention may contain cure sites other than the halogen-based cure sites, such as epoxy-based cure sites and/or diene-based cure sites.

The following compounds are given as preferred examples of the alkyl acrylate used in the halogen containing acryl rubber: methyl acrylate, ethyl acrylate, n-propyl acrylate, isopropyl acrylate, n-butyl acrylate, isobutyl acrylate, n-hexyl acrylate, 2-ethylhexyl acrylate, and cyclohexyl acrylate. Of these, ethyl acrylate and n-butyl acrylate are especially preferred.

These alkyl acrylates may be used either individually or in combinations of two or more.

Given as examples of the preferred alkoxyalkyl acrylate are methoxy methyl acrylate, ethoxy methyl acrylate, 2-methoxy ethyl acrylate, 2-ethoxyethyl acrylate, 2-propoxyethyl acrylate, 2-butoxyethyl acrylate, 3-methoxy propyl acrylate, 4-methoxy butyl acrylate. Of these, 2-methoxy ethyl acrylate and 2-ethoxyethyl acrylate are especially desirable.

These alkoxyalkyl acrylate may be used either individually or in combinations of two or more.

Next, given as examples of the halogen containing-monomers are esters of a halogen-containing saturated carboxylic acid and an unsaturated alcohol, such as vinyl chloroacetate, vinyl 2-chloropropionate, and allyl chloroacetate; haloalkyl (meth)acrylates, such as chloromethyl (meth)acrylate, 1-chloroethyl (meth)acrylate, 2-chloroethyl (meth)acrylate, 1,2-dichloroethyl (meth)acrylate, 2-chloropropyl (meth)acrylate, 3-chloropropyl (meth) acrylate, 2,3-dichloropropyl (meth)acrylate; halogen-containing unsaturated ethers, such as chloromethyl vinyl ether, 2-chloroethyl vinyl ether, 3-chloropropyl vinyl ether, 2-chloroethyl allyl ether, and 3-chloropropyl allyl ether; halogen-containing unsaturated ketones, such as 2-chloroethyl vinyl ketone, and 3-chloropropyl vinyl ketone, 2-chloroethyl allyl ketone; haloacyloxy alkyl (meth) acrylates, such as 2-(chloroacetoxy)ethyl (meth)acrylate, 2-(chloroacetoxy) propyl (meth)acrylate, and 3-(chloroacetoxy)propyl (meth)acrylate; halomethyl group-containing aromatic vinyl compounds, such as p-chloromethyl styrene, p-chloromethyl-α-methyl styrene, and bis(chloromethyl)styrene; halogen-containing unsaturated amides, such as N-chloromethyl (meth)acrylamide and N-(chloroacetamidemethyl) (meth)acrylamide; and haloacetyl group-containing unsaturated monomers, such as 2-(chloroacetylcarbamoyloxy)ethyl (meth)acrylate, 3-(chloroacetylcarbamoyloxy)propyl (meth)acrylate, 3-(hydroxychloroacetoxy)propyl (meth)acrylate, and 3-(hydroxychloroacetoxy)propyl allyl ether, p-vinyl benzyl chloroacetate; and the like.

These halogen-containing monomers may be used either individually or in combinations of two or more.

In addition to these halogen-containing monomers, one or more silane compound or silicon compound which contains a polymerizable unsaturated group, such as (meth) acryloyl group, vinyl group, allyl group, or styryl group, and an active halogen atom can be also used as the monomer for introducing a halogen-based cure site.

Moreover, monomers which can produce cure sites other than the halogen-based cure sites may be used. Given as examples of such monomers are epoxy group-containing monomers, such as glycidyl (meth)acrylate, pyrilglycidyl ether, allyl glycidyl ether, and (metha)acryl glycidyl ether, and (none)conjugated diene-type monomers, such as 1,3-butadiene, isoprene, piperylene, ethylidene norbornene, dicyclopentadiene, dicyclopentadienyl (meth)acrylate, and 2-dicyclopentadienylethyl (meth)acrylate.

These monomers may be used either individually or in combinations of two or more.

Given as examples of monomers other than those mentioned above (hereinafter referred to as other monomers) which can be copolymerized with the alkyl acrylate and/or alkoxyalkyl acrylate are the following compounds: unsaturated carboxylic acid or the anhydrides thereof, such as (meth)acrylic acid, ethacrylic acid, crotonic acid, cinnamic acid, maleic acid, maleic anhydride, fumaric acid, itaconic acid, itaconic anhydride, citraconic acid, citraconic anhydride, and mesaconic acid; (meth)acrylates, such as methyl methacrylate, ethyl methacrylate, n-propyl methacrylate, isopropyl methacrylate, n-butyl methacrylate, isobutyl methacrylate, sec-butyl methacrylate, t-butyl methacrylate, n-hexyl methacrylate, 2-ethylhexyl methacrylate, cyclohexyl methacrylate, 2-hydroxyethyl (meth)acrylate, 2-hydroxypropyl (meth)acrylate, 3-hydroxypropyl (meth)acrylate, 2-hydroxybutyl (meth) acrylate, 3-hydroxy butyl (meth)acrylate, 4-hydroxybutyl (meth)acrylate, ethylene glycol di(meth)acrylate, propylene glycol di(meth)acrylate, polyethylene glycol di(meth) acrylate, polypropylene glycol di(meth)acrylate, trimethylolpropane tri(meth)acrylate, oligo(meth)acrylates of hydroxyl group-containing polyester, and oligo(meth) acrylates of hydroxyl group-containing polyether; other unsaturated carboxylates, such as methyl crotonate, methyl cinnamate, monomethyl maleate, monoethyl maleate, mono-n-butyl maleate, monomethyl fumarate, dimethyl maleate, dimethyl fumarate; unsaturated nitriles, such as acrylonitrile and cyanated vinylidene; unsaturated amides and the derivatives thereof, such as (meth)acrylamide, diacetone (meth)acrylamide, N-methylol (meth)acrylamide, N-methoxymethyl (meth)acrylamide, N-2-methoxyethyl (meth)acrylamide, N,N'-methylene bis(meth)acrylamide, N,N'-ethylene bis(meth)acrylamide, and ethacrylamide; unsaturated alcohols and their derivatives, such as allyl alcohol, vinyl acetate, vinyl propionate, vinyl stearate, vinyl benzoate, diallyl phthalate, and triallyl isocyanurate; esters of an unsaturated carboxylic acid and an unsaturated alcohol, such as allyl (meth)acrylate and methacryl (meth) acrylate; aromatic vinyl compounds, such as α-methylstyrene, o-methylstyrene, m-methylstyrene, p-methylstyrene, p-methoxystyrene, p-dimethylaminostyrene, p-acetoxystyrene, 2-vinylpyridine, 4-vinylpyridine, divinyl benzene, and diisopropenyl benzene; ethylene; and silane compounds or silicone compounds having at least one polymerizable unsaturated group, such as (meth)acryloyl group, vinyl group, allyl group, and styryl group.

These other monomers may be used either individually or in combinations of two or more.

When the halogen-containing acrylic rubber is manufactured by the copolymerization of an alkyl acrylate and/or alkoxyalkyl acrylate, a halogen-containing monomer and, optionally, with other monomers, the content of the alkyl acrylate and/or alkoxyalkyl acrylate in these monomer mixtures is usually in the range of 30–99.9 wt %, and preferably 75–99.5 wt %; the content of halogen-containing monomers is usually 0.1–15 wt %, and preferably 0.5–7 wt %; and the content of other optional monomers is usually 0–55 wt %.

When the alkyl acrylate and/or alkoxyalkyl acrylate are (co)polymerized to manufacture the halogen-containing acrylic rubber, the reaction is carried out by a suitable polymerization method such as block polymerization, solution polymerization, emulsion polymerization, suspension polymerization, and block-suspension polymerization using a radical polymerization initiator. The polymerization may be either a continuous type or a batch type.

(2) Triazine thiol compound

Next, as examples of the triazine thiol compounds used in the present invention, dithiol derivatives or trithiol derivatives of 1,3,5-triazine and the like can be given. Specific examples of the triazine thiol compounds are 6-anilino-1,3,5-triazine-2,4-dithiol, 6-dimethylamino-1,3,5-triazine-2,4-dithiol, 6-diethylamino-1,3,5-triazine-2,4-dithiol, 6-di-n-propylamino-1,3,5-triazine-2,4-dithiol, 6-diisopropylamino-1,3,5-triazine-2,4-dithiol, 6-di-n-butylamino-1,3,5-triazine-2,4-dithiol, 6-n-hexylamino-1,3,5-triazine-2,4-dithiol, 1,3,5-triazine-2,4-dithiol, 6-n-octylamino-1,3,5-triazine-2,4,6-trithiol, and the like.

These triazine thiol compound may be used either individually or in combinations of two or more.

The amount of triazine thiol compound used in the present invention is usually in the range of 0.05–5 parts by weight, preferably 0.1–2 parts by weight, for 100 parts by weight of the halogen-containing acrylic rubber. The rate of crosslinking and the degree of crosslinking tend to decrease if the amount of triazine thiol compound is less than 0.05 part by weight. If more than 5 parts by weight, the storage stability of the rubber composition may be impaired and the crosslink density is too high so that the crosslinking rubber tends to be brittle.

(3) Dithiocarbamine acid derivatives and thiuram sulfide compounds

The compounds represented by the following formula (I) can be given as examples of the dithiocarbamine acid derivatives used in the present invention.

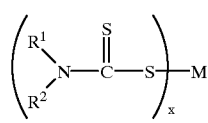

(I)

In the formula, $R^1$ and $R^2$ individually represent an alkyl group, aralkyl group, or cycloalkyl group, or $R^1$ and $R^2$ form a heterocyclic structural unit in combination; M denotes a metal with a valence of x; and x is an integer from 1–3.

In the formula (I), the carbon atom number for each of $R^1$ and $R^2$ is preferably 1–12. Given as specific examples of the metal M are zinc, copper, cadmium, lead, bismuth, iron, cobalt, manganese, tellurium, and selenium.

Specific examples of such dithiocarbamic acid derivatives include zinc dimethyldithiocarbamate, copper dimethyldithiocarbamate, lead dimethyldithiocarbamate, zinc diethyldithiocarbamate, zinc di-n-butyldithiocarbamate, zinc di-n-hexyldithiocarbamate, zinc di-n-octyldithiocarbamate, zinc di-n-decyldithiocarbamate, zinc di-n-dodecyldithiocarbamate, zinc methylbenzyldithiocarbamate, zinc dibenzyldithiocarbamate, zinc methylcyclohexyldithiocarbamate, zinc dicyclohexyldithiocarbamate, cadmium dimethyldithiocarbamate, cadmium diethyldithiocarbamate, bismuth dimethyldithiocarbamate, bismuth diethyldithiocarbamate, iron dimethyldithiocarbamate, iron diethyldithiocarbamate, tellurium dimethyldithiocarbamate, tellurium diethyldithiocarbamate, selenium dimethyldithiocarbamate, selenium diethyldithiocarbamate, and zinc N-pentamethylenedithiocarbamate.

These dithiocarbamic acid derivatives may be used either individually or in combinations of two or more.

The compounds shown by the following formula (II) can be given as examples of the thiuram sulfide compounds.

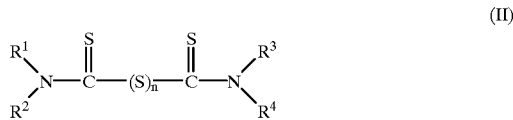

(II)

In the formula, $R^1$–$R^4$ individually represent an alkyl group, aralkyl group, or cycloalkyl group, or $R^1$ and $R^2$ and/or $R^3$ and $R^4$ together form a heterocyclic structural unit, and n is an integer from 1–8.

In the formula (II), the carbon atom number for each of $R^1$–$R^4$ is preferably 1–12.

Given as specific examples of such thiuram sulfide compounds are tetramethyl thiuram monosulfide, tetraethyl thiuram monosulfide, tetra-n-butyl thiuram monosulfide, tetramethyl thiuram disulfide, tetraethyl thiuram disulfide, tetra-n-butyl thiuram disulfide, tetra-n-hexyl thiuram disulfide, tetra-n-octyl thiuram disulfide, tetra-n-decyl thiuram disulfide, tetra-n-dodecyl thiuram disulfide, N,N'-dimethyl-N,N'-dibenzyl thiuram disulfide, tetrabenzyl thiuram disulfide, tetracyclohexyl thiuram disulfide, N,N'-dimethyl-N,N'-dicyclohexyl thiuram disulfide, and di(pentamethylene) thiuram disulfide.

Of these thiuram sulfide compounds, the compounds having 4 carbon atoms for all of $R^1$ to $R^4$ are particularly preferred.

These thiuram sulfide compounds may be used either individually or in combinations of two or more.

The amount of dithiocarbamic acid derivatives and/or thiuram sulfide compounds used in the present invention is usually 0.1 to 10 parts by weight, preferably 0.5 to 5 parts by weight, for 100 parts by weight of the halogen-containing acrylic rubber.

(4) Hydrotalcite compound and organic tin compound

Either synthetic hydrotalcites or natural hydrotalcites may be used as the hydrotalcite compound in the present invention. The structural formulas of typical hydrotalcite compounds are as follows:

$Mg_6Al_2(OH)_{16}CO_3 \cdot 4H_2O$ $M(II)_xAl_2(OH)_yA(n) \cdot mH_2O$ wherein M(II) represents Mg or Zn, A(n) indicates an anion with a valence of n, x is a number of 2 or more, n is 1 or 2, z is a number of 2 or more, y=(2x+6−nz), and m is a positive number.

These hydrotalcite compounds may be used either individually or in combinations of two or more.

The compound shown by the following formula (III) can be given as an example of the above organic tin compound.

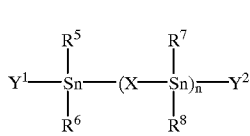

(III)

In the formula, $R^5$–$R^8$ are individually an alkyl group, $Y^1$ and $Y^2$ individually indicate a residue of mercaptan or lauric acid, maleic acid, or mercaptocarboxylic acid, x denotes a divalent group, and n is an integer from 0–5.

In the formula (III), the number of carbon atom in each alkyl group for $R^5$–$R^8$ is preferably 1–12. Given as specific examples of the divalent group represented by X are —O—, —S—, and —OCOCH=CHCOO—.

The following compounds can be given as specific examples of such an organic tin compound: di-n-butyl tin dilaurate, di-n-octyl tin dilaurate, di-n-butyl tin dimaleate, di-n-octyl tin dimaleate, di-n-butyl tin maleate polymer, di-n-octyl tin maleate polymer, di-n-butyl tin di-n-butyl mercaptide, di-n-octyl tin di-n-octyl mercaptide, di-n-octyl tin di-iso-octyl mercaptide, di-n-octyl tin-S,S'-bis(iso-octylmercaptoacetate), di-n-butyl tin oxide, di-n-octyl tin oxide, di-n-butyl tin sulfide, and di-n-octyl tin sulfide.

These organic tin compounds may be used either individually or in combinations of two or more.

The amount of hydrotalcite compounds and/or organotin compounds used in the present invention is usually 0.1–10 parts by weight, preferably 0.5–5 parts by weight, for 100 parts by weight of the halogen-containing acrylic rubber. If this amount of hydrotalcite compounds and/or organotin compounds is less than 0.1 parts by weight, the effects of suppressing metal corrosion or metal contamination in the rubber composition and the improvement in the rate of crosslinking tend to be impaired. An amount exceeding 10 parts by weight does not bring about improvement in these effects proportionate to the excess amount and is thus uneconomical.

(5) Aromatic carboxylic acid compound and the acid anhydride Given as examples of the aromatic carboxylic acid compound and the acid anhydride thereof used in the present invention are aromatic monocarboxylic acids, such as benzoic acid and salicylic acid; aromatic dicarboxylic acids (and acid anhydrides), such as o-phthalic acid, phthalic anhydride, isophthalic acid, and terephthalic acid; aromatic tricarboxylic acids (and acid anhydrides), such as trimellitic acid, trimelliticanhydride, benzene-1,2,3-tricarboxylicacid, and benzene-1,2,4-tricarboxylic acid; aromatic tetracarboxylic acids (and acid anhydrides), such as pyromellitic acid, benzene-1,2,3,4-tetracarboxylic acid, and benzene-1, 2,3,5-tetracarboxylic acid; and nucleus substituted derivatives of these compounds.

Of these aromatic carboxylic acid compounds and acid anhydrides, aromatic dicarboxylic acids (or anhydrides) are particularly preferred.

These aromatic carboxylic acid compounds may be used either individually or in combinations of two or more.

The amount of aromatic carboxylic acid compounds and/or the acid anhydrides used in the composition of the present invention is usually 0.05–5 parts by weight, preferably 0.1–2 parts by weight, for 100 parts by weight of the halogen-containing acrylic rubber. If this amount of aromatic carboxylic acid compounds and/or the acid anhydrides is more than 5 parts by weight or less than 0.05 part by weight, the balance of storage stability and rate of crosslinking of the rubber composition tends to decrease.

(6) White filler

The white filler used in the present invention must have a pH in the range of 2–10, preferably 3–8. If the pH of the white filler is lower than 2, the rate of crosslinking is retarded; if higher than 10, scorching tends to be produced.

Given as examples of white fillers used in the present invention are white carbon (silica), Celite, talc, clay, calcined clay, magnesium carbonate, magnesium methasilicate, calcium carbonate, aluminum hydroxide, magnesium hydroxide, and titanium dioxide. Of these, white carbon is desirable for obtaining a high crosslinking density. These white fillers may be used after surface treatment using a silane coupling agent, alcohol, or amine.

These white fillers may be used either individually or in combinations of two or more.

The amount of white fillers used in the present invention is usually 20–200 parts by weight, preferably 30–150 parts by weight, for 100 parts by weight of the halogen-containing acrylic rubber. If this amount of white fillers is less than 20 parts by weight, the hardness of the resulting composition tends to decrease; if more than 200 parts by weight, processability of the composition tends to be impaired.

(7) Silane coupling agent

There are no specific limitations to the silane coupling agent used in the present invention. Given as examples of the silane coupling agent are vinyl trimethoxysilane, vinyl triethoxysilane, vinyl tris(b-methoxyethoxy)silane, vinyl trichlorosilane, vinyl triacetoxysilane, N-(β-aminoethyl)-γ-aminopropyltrimethoxysilane, γ-aminopropyltrimethoxysilane, γ-aminopropyltriethoxysilane, γ-glycidoxypropyltrimethoxysilane, γ-glycidoxypropylmethyldimethoxysilane, β-(3,4-epoxycyclohexyl)ethyltrimethoxysilane, γ-methacryloxypropyl trimethoxysilane, γ-methacryloxypropyl tris(β-methoxyethoxy)silane, γ-mercaptopropyltrimethoxysilane, methyltrimethoxysilane, methyltriethoxysilane, hexamethyldisilazane, γ-anilinopropyltrimethoxysilane, N-[β-(N-vinylbenzalamino)ethyl]-γ-aminopropyltrimethoxysilane hydrochloride, and the like.

These silane coupling agents may be used either individually or in combinations of two or more.

The amount of the silane coupling agents used in the present invention is usually 0.1–10 parts by weight, preferably 0.1–8 parts by weight, for 100 parts by weight of the halogen-containing acrylic rubber. The tensile characteristics and permanent compression set of the crosslinking rubber may be insufficient if this amount of silane coupling agent is less than 0.1 part by weight. If more than 10 parts by weight, on the other hand, ordinary state properties of the resulting crosslinking rubber may decrease, resulting in impaired rubbery elasticity.

(8) Acrylate polymer

The polymer containing alkyl acrylate and/or alkoxyalkyl acrylate as major components (excluding a crosslinking group-containing acrylic rubber) (hereinafter called "acrylate polymer") is a (co)polymer containing alkyl acrylate and/or alkoxyalkyl acrylate, as major components, and, optionally, other monomers.

The same compounds given as examples of the alkyl acrylate and/or alkoxyalkyl acrylate in the explanation of halogen-containing acrylic rubber can be used as the alkyl acrylate and/or alkoxyalkyl acrylate in the acrylate polymer. These alkyl acrylates and/or alkoxyalkyl acrylates may be used either individually or in combinations of two or more in producing the acrylate polymer.

The same compounds given as examples of other monomers used for the halogen-containing acrylic rubber can be used as other monomers to be polymerized together with the alkyl acrylate and/or alkoxyalkyl acrylate for producing the acrylate polymer. The monomers may be used either individually or in combinations of two or more.

When the monomer components of which the major components are the alkyl acrylates and/or alkoxyalkyl acrylates are (co)polymerized to manufacture the acrylate polymer, the reaction is carried out by a suitable polymerization method such as block polymerization, solution polymerization, emulsion polymerization, suspension polymerization, and block suspension polymerization using a radical polymerization initiator. The polymerization may be either a continuous type or a batch type.

The content of the alkyl acrylates and/or alkoxyalkyl acrylates in the monomer mixture for producing the acrylate polymer is usually in the range of 30–100 wt %, and preferably 75–100 wt %, and the content of other optional monomers is usually 0–70 wt %, and preferably 0–25 wt %.

The amount of acrylate polymer incorporated into the crosslinkable composition of the present invention is usually in the range of 0.1–10 parts by weight, preferably 0.5–5 parts by weight, for 100 parts by weight of the halogen-containing acrylic rubber.

When the mixture (A) is previously prepared by blending the acrylate polymer (8), which is a polymer containing alkyl acrylate and/or alkoxyalkyl acrylate as major components (excluding a crosslinkable acrylic rubber), and either or both of the above component (2) and component (4), the preferable ratio of these component is 10–60 wt % of acrylate polymer (8), 10–80 wt % of component (2), and 10–80 wt % of component (4), provided that the total of the acrylate polymer (8), component (2), and component (4) is 100 wt %. When the mixture (A) is prepared from only the acrylate polymer (8) and the component (2), the proportion is preferably 10–80 wt % of the acrylate polymer (8) and 20–90 wt % of the component (2). When the mixture (A) is prepared from only the acrylate polymer (8) and the component (4), the proportion is preferably 10–80 wt % of the acrylate polymer (8) and 20–90 wt % of the component (4).

Beside the above-described components (1)–(8), various additives may be optionally incorporated into the acrylic rubber composition of the present invention. Such additives include aging preventives, antioxidants, photostabilizers, scorch retarders, cross-linking retardation agents, plasticizers, processing adjuvants, lubricants, adhesives, flame retarders, antifungal agents, antistatic agents, colorants, and the like.

Moreover, other rubbery components, elastomers, or resin components can be added to the extent that the characteristics of the acrylic rubber composition is not adversely affected. Given as examples of such rubbery components, elastomers, or resin components are olefin-type elastomers, styrene Ac elastomers, vinyl chloride elastomers, polyester elastomers, polyamide elastomers, polyurethane elastomers, polysiloxane elastomers, natural rubbers, polybutadiene rubbers, polyisoprene rubbers, styrene-butadiene rubbers, acrylonitrile-butadiene rubbers, and polychloroprene rubbers.

One of the acrylic rubber composition of the present invention which comprises the above components (1)–(7) can be prepared by blending these components (1)–(7) by a suitable means such as roller mixing, Banbury mixing, screw mixing, or solution mixing. There are no specific limitations to the order in which these components are added.

The other acrylic rubber composition of the present invention which comprises the above-mentioned mixture (A) in addition to the components (1)–(7) can be prepared by producing the mixture (A) from the component (8) and the component (2) and/or the component (4), and blending the resulting mixture (A) with (B) the components (1), (3), (5), (6), and (7) and (C) balance of the above components (2) or component (4), or both which are not blended in the above mixture (A). Any suitable mixing means such as roller mixing, Banbury mixing, screw mixing, and solution mixing may be used without any specific limitations. There are no specific limitations to the order in which the component (8), component (2), and component (4) are added for producing the mixture (A). The dispersibility of the acrylic rubber composition is improved when the composition is prepared by previously producing the mixture (A) by blending the component (8), component (2), and component (4), and then blending the other components (the mixtures (B) and (C)) with the mixture (A).

The acrylic rubber composition of the present invention can be crosslinked by heating the composition to 150° C. or higher, preferably 150–200° C., for several minutes to several hours. Any suitable method of heating, such as press heating, steam heating, oven heating, or hot air heating, can be adopted as the heating method during crosslinking. Usually, it is desirable to press-heat the composition in any desired configuration to first crosslink, followed by post-heating by steam heating, oven heating, hot air heating, or the like.

The acrylic rubber composition of the present invention is useful as a sealing material for O-rings, oil seals, and bearing seals in a wide variety of fields such as transportation machines such as vehicles, general machines, plants, electron-electricity machines, and buildings, and as a cushioning or protective material, an electric wire coating material, and industrial belts, hoses, sheets, and the like.

Other features of the invention will become apparent in the course of the following description of the exemplary embodiments which are given for illustration of the invention and are not intended to be limiting thereof.

EXAMPLES

In the Examples and Comparative Examples below, properties of crosslinked acrylic rubber compositions and non-crosslinked acrylic rubber compositions were evaluated conforming to JIS K6300 and JIS K6301.

The storage stability was evaluated by change in the $V_{max}$ at ML 1–150° C. in the Mooney scorching test on samples which were allowed to stand in a thermo-hygrostat at 25° C. and RH 50% for one month.

The cure rate test was carried out using a curast meter (JSR Type-5™, manufactured by Japan Synthetic Rubber Co., Ltd.) under conditions of 170° C. and measurement time of 20 minutes, and evaluated using t'c (90) (minutes) as an index for the rate of crosslinking.

Evaluation of water resistance was carried out by dipping test specimens in distilled water at 100° C. for 70 hours.

The metal corrosion test was carried out after allowing test specimens (thickness: 12.7 mm) for the measurement of permanent compression set inserted in a cold rolling steel plate (SUS) to stand in an oven at 175° C. for 72 hours. After removing the test specimens from the oven, the degree of corrosion of the steel plate surface was evaluated by the naked eye. The results were rated according to the following standard.

⊚: excellent; ◯: good; Δ: fair; X: bad

Figure 2A:
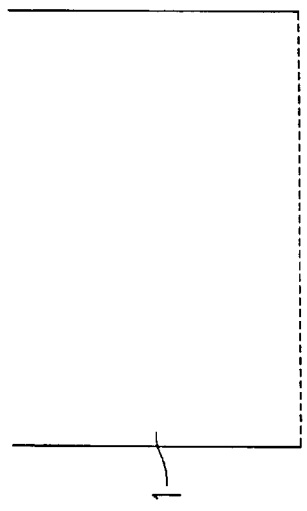
Figure 2B:
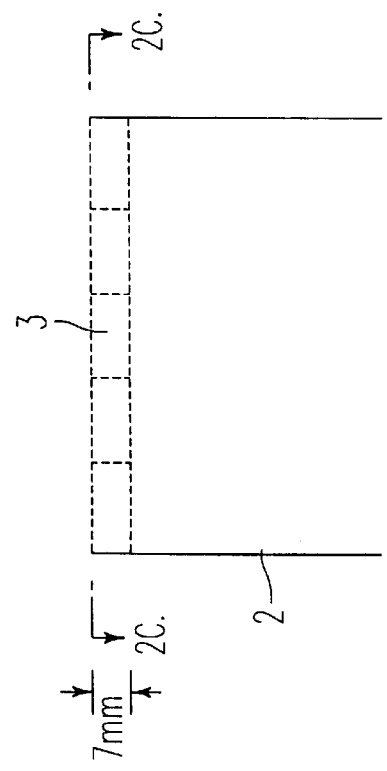

The metal contamination test was carried out using a jig (a pair of hot plates made of SUS with the surface plated with chromium) shown in FIG. 2. In FIG. 2, wherein a cross-section of the jig is shown on the left side and the test specimen view from the arrow A—A is shown on the right side, the numerals 1 and 2 indicate hot plates; 3 is a test specimen; and 4 is a hole (four in total) provided in the test specimen. The test specimen was crosslinked 100 times, each crosslinking operation consisting of heating at 180° C. for 5 minutes, followed by naked eye observation of the degree of metal contamination. The results were rated according to the following standard.

⊚: excellent; ◯: good; Δ: fair; X: bad

Examples 1–13 and Comparative Examples 1–7

100 parts by weight of a halogen-containing acrylic rubber (JSR AREX117™ manufactured by Japan Synthetic Rubber Co., Ltd.), 80 parts by weight of a white filler, 1 part by weight of stearic acid, 2 parts by weight of an antioxidant (NOCRAC CDM™), and 1 part by weight of a silane coupling agent were mixed in a Banbury mixer. To the resulting mixture were added the components shown in Table 1 (Examples 1–8) or Table 2 (Examples 9–15) and the mixtures were mixed in an open roller to obtain acrylic rubber compositions. The compositions were crosslinked in avulcanizing press at 170° C. for 10 minutes, then further crosslinked in an oven at 180° C. for one hour.

The results of evaluation of properties of crosslinked acrylic rubber compositions and non-crosslinked acrylic rubber compositions are shown in Table 1 (Examples 1–8) and Table 2 (Examples 9–15). Cure rate curves obtained in the cure rate tests are shown in FIG. 1.

As can be seen from these results, the acrylic rubber compositions of the present invention exhibited excellent well-balanced characteristics; that is, the compositions exhibited superior storage stability, anti-scorching properties, a high rate of crosslinking as shown in FIG. 1, excellent water resistance and mechanical characteristics (tensile strength, permanent compression set), and minimal metal corrosion and metal contamination.

Example 14

100 parts by weight of a halogen-containing acrylic rubber (JSR AREX117™ manufactured by Japan Synthetic Rubber Co., Ltd.), a master batch consisting of 1.0 part by weight of an acrylate polymer (JSR AREX295™ manufactured by Japan Synthetic Rubber Co., Ltd.) and 0.8 part by weight of a triazine thiol compound (ZISNET F™), 80 parts by weight of a white filler, 1 part by weight of stearic acid, 2 parts by weight of an aging preventive (NOCRAC CD™), and 1 part by weight of a silane coupling agent were mixed in a Banbury mixer. To the resulting mixture were added the components shown in Table 2 and the mixture was mixed in an open roller to obtain acrylic rubber compositions. The compositions were crosslinked in a vulcanizing press at 170° C. for 10 minutes, then further crosslinked in an oven at 180° C. for one hour.

The results of evaluation of properties of crosslinked acrylic rubber composition and non-crosslinked acrylic rubber composition are shown in Table 2.

As can be seen from these results, this acrylic rubber composition exhibited excellent well-balanced characteristics; that is, the composition exhibited superior storage stability, anti-scorching properties, a high rate of crosslinking, excellent water resistance and mechanical characteristics (tensile strength, permanent compression set) and minimal metal corrosion and metal contamination.

Example 15

100 parts by weight of a halogen-containing acrylic rubber (JSR AREX117™ manufactured by Japan Synthetic Rubber Co., Ltd.), a master batch consisting of 1.8 part by weight of an acrylate polymer (JSR AREX295™), 0.8 part by weight of a triazine thiol compound (ZISNET F™), and 1 part by weight of hydrotalcite (DHT-4A-2), 80 parts by weight of a white filler, 1 part by weight of stearic acid, 2 parts by weight of an aging preventive (NOCRAC CD™), and 1 part by weight of a silane coupling agent were mixed in a Banbury mixer. To the resulting mixture were added the components shown in Table 2 and the mixture was mixed in an open roller to obtain acrylic rubber compositions. The compositions were crosslinked in a vulcanizing press at 170° C. for 10 minutes, then further crosslinked in an oven at 180° C. for one hour.

The results of evaluation of properties of crosslinked acrylic rubber composition and non-crosslinked acrylic rubber composition are shown in Table 2.

As can be seen from these results, this acrylic rubber composition exhibited excellent well-balanced characteristics; that is, the composition exhibited superior storage stability, anti-scorching properties, a high rate of crosslinking, excellent water resistance and mechanical characteristics (tensile strength, permanent compression set) and minimal metal corrosion and metal contamination.

Comparative Example 1–7

100 parts by weight of a halogen-containing acrylic rubber (JSR AREX117™ manufactured by Japan Synthetic Rubber Co., Ltd.), 80 parts by weight of a white filler, 1 part by weight of stearic acid, 2 parts by weight of an aging preventive (NOCRAC CD™), and 1 part by weight of a silane coupling agent were mixed in a Banbury mixer. To the resulting mixture were added the components shown in Table 3 and the mixture was mixed in an open roller to obtain acrylic rubber compositions. The compositions were crosslinked in a vulcanizing press at 170° C. for 10 minutes, then further crosslinked in an oven at 180° C. for one hour.

The results of evaluation of properties of crosslinked acrylic rubber composition and non-crosslinked acrylic rubber composition are shown in Table 3. The cure rate curves obtained by the cure rate tests for the compositions in Comparative Examples 1 and 2 are shown in Table 1.

Various components used in the Examples and Comparative Examples shown in Tables 1–3 are as follows:

Component (1)
JSR AREX117™: Halogen-containing acrylic rubber (manufactured by Japan Synthetic Rubber Co., Ltd.)

Component (8)
JSR AREX295™: Acrylic polymer (manufactured by Japan Synthetic Rubber Co., Ltd.)

Component (2)
ZISNET F: Triazine thiol (manufactured by Sankyo Kasei Kogyo K.K.)

Component (3)
NOCCELER BZ: Zinc dithiocarbamate (manufactured by Ouchishinkou Kagaku Kogyo K.K.)

NOCCELER TBT-N: Tetra-n-butylthiuram disulfide (manufactured by Ouchishinkou Kagaku Kogyo K.K.)

Component (4)

DHT-4A-2: Hydrotalcite, surface treated type (manufactured by Kyowa Kagaku Kogyo K.K.)

DHT-4C: Hydrotalcite, sintered type (manufactured by Kyowa Kagaku Kogyo K.K.)

DHT-4A: Hydrotalcite with crystal water removed from DHT-4A-2 (manufactured by Kyowa Kagaku Kogyo K.K.)

ALCAMIZER 4-2: Synthetic hydrotalcite (manufactured by Kyowa Kagaku Kogyo K.K.)

KS-41A-5: Di-n-butyl tin dimercaptide ester type (manufactured by Kyodo Chemical Co., Ltd.)

KS-20: Di-n-butyl tin dilaurate type (manufactured by Kyodo Chemical Co., Ltd.)

Component (5)

SCONOC 5: Phthalic anhydride (manufactured by Ouchishinkou Kagaku Kogyo K.K.)

Component (6)

NIPSIL VN3: Wet silica (pH=5.5–6.5, manufactured by Nippon Silica Co., Ltd.)

TOKUSIL GU: Wet silica (pH=8–9, manufactured by Tokuyama Soda Co., Ltd.)

CARPLEX 1120: Wet silica (pH=10.6, manufactured by Shionogi & Co., Ltd.)

SATINTON No. 5: Sintered clay (pH=5–6, manufactured by Tsuchiya Kaolin Kogyo Co., Ltd.)

TRANSLINK 555: Silane treated clay (pH=8.5–9.5, manufactured by Tsuchiya Kaolin Kogyo Co., Ltd.)

NULOK 321: Silane reformed clay (pH=7–8, manufactured by Sanyo Boeki Co., Ltd.)

Component (7)

TSL 8350: γ-Glycidoxypropyltrimethoxysilane (manufactured by Toshiba Silicone Co., Ltd.)

TSL 8320: γ-Chloropropyltrimethoxysilane (manufactured by Toshiba Silicone Co., Ltd.)

TSL 8370: γ-Methacryloxypropyltrimethoxysilane (manufactured by Toshiba Silicone Co., Ltd.)

TSL 8380: γ-Mercaptopropyltrimethoxysilane (manufactured by Toshiba Silicone Co., Ltd.)

(Other additives)

NOCRAC CD: Diphenylamine (manufactured by Ouchishinkou Kagaku Kogyo K.K.)

MgO #150: Magnesium oxide (manufactured by Kyowa Kagaku Kogyo K.K.)

SULFAX A: Sulfur (manufactured by Tsurumi Kagaku Kogyo K.K.)

NONSOUL SN-1: Sodium stearate (manufactured by Nippon Oil and Fat Co., Ltd.)

NONSOUL SK-1: Potassium stearate (manufactured by Nippon Oil and Fat Co., Ltd.)

TABLE 1

| | Example | | | | | | | |
|---|---|---|---|---|---|---|---|---|
| | 1 | 2 | 3 | 4 | 5 | 6 | 7 | 8 |
| Components | | | | | | | | |
| JSR AREX117 | 100 | 100 | 100 | 100 | 100 | 100 | 100 | 100 |
| JSR AREX295 | — | — | — | — | — | — | — | — |
| ZISNET F | 0.8 | 0.8 | 0.8 | 0.8 | 0.8 | 0.8 | 0.8 | 0.8 |
| NOCCELER BZ | 2 | 2 | 2 | 2 | 2 | 2 | — | — |
| NOCCELER TBT-N | — | — | — | — | — | — | 3 | 3 |
| DHT-4A-2 | 1 | 1 | 1 | — | — | — | — | — |
| DHT-4C | — | — | — | 1 | 1 | 1 | 1 | — |
| DHT-4A | — | — | — | — | — | — | — | — |
| ALCAMIZER 4-2 | — | — | — | — | — | — | — | — |
| KS-41A-5 | — | — | — | — | — | — | — | 2 |
| KS-20 | — | — | — | — | — | — | — | — |
| SCONOC 5 | 0.7 | 0.7 | 0.7 | — | — | — | — | 0.7 |
| o-Phthalic acid | — | — | — | 0.7 | 0.7 | 0.7 | 0.7 | — |
| NIPSIL VN3 | 20 | — | 20 | 20 | 20 | 20 | 20 | 20 |
| TOKUSIL GU | — | 20 | — | — | — | — | — | — |
| CARPLEX 1120 | — | — | — | — | — | — | — | — |
| SATINTON No. 5 | 60 | 60 | — | 60 | 60 | 60 | 60 | 60 |
| TRANSLINK 555 | — | — | 60 | — | — | — | — | — |
| NULOK 321 | — | — | — | — | — | — | — | — |
| TSL8350 | 1 | 1 | 1 | — | — | — | — | — |
| TSL8320 | — | — | — | 1 | — | — | — | — |
| TSL8370 | — | — | — | — | 1 | — | — | — |
| TSL8380 | — | — | — | — | — | 1 | 1 | 1 |
| Stearic acid | 1 | 1 | 1 | 1 | 1 | 1 | 1 | 1 |
| NOCRAC CD | 2 | 2 | 2 | 2 | 2 | 2 | 2 | 2 |
| MgO #150 | — | — | — | — | — | — | — | — |
| SULFAX A | — | — | — | — | — | — | — | — |
| NONSOUL SN-1 | — | — | — | — | — | — | — | — |
| NONSOUL SK-1 | — | — | — | — | — | — | — | — |
| Non-crosslinked product | | | | | | | | |
| Mooney scorching test t5 (min) | 9.2 | 6.7 | 5.8 | 9.7 | 10.2 | 6.3 | 9.5 | 8.4 |
| Storage stability test (%) | 10 | 18 | 30 | 11 | 10 | 13 | 3 | 2 |
| Cure rate test t'c (90) (min) | 8 | 5.8 | 3.8 | 8.1 | 8.3 | 6.8 | 8.4 | 7.2 |
| Crosslinked product | | | | | | | | |
| Tensile test | | | | | | | | |
| Tensile strength (Mpa) | 10.8 | 11.3 | 11.4 | 10.7 | 10.6 | 12 | 11.8 | 11.9 |
| Elongation (%) | 290 | 200 | 190 | 240 | 250 | 190 | 200 | 200 |
| Hardness (JIS-A) | 73 | 74 | 74 | 72 | 72 | 75 | 74 | 74 |
| Permanent compression set | | | | | | | | |
| 150° C. × 70 Hrs (%) | 45 | 40 | 38 | 40 | 45 | 33 | 34 | 32 |
| 175° C. × 70 Hrs (%) | 58 | 54 | 49 | 56 | 57 | 46 | 50 | 47 |
| Water resistance test | | | | | | | | |
| CH (point) | −18 | −14 | −12 | −17 | −18 | −13 | −14 | −15 |
| Δ V (%) | 28 | 22 | 20 | 26 | 28 | 22 | 24 | 25 |
| Metal corrosion test | ◎ | ◎ | ◎ | ◎ | ◎ | ◎ | ◎ | ◎ |
| Meal contamination test | ◎ | ◎ | ◎ | ◎ | ◎ | ◎ | ◎ | ◎ |

TABLE 2

| | Example | | | | | | |
|---|---|---|---|---|---|---|---|
| | 9 | 10 | 11 | 12 | 13 | 14 | 15 |
| Components | | | | | | | |
| JSR AREX117 | 100 | 100 | 100 | 100 | 100 | 100 | 100 |
| JSR AREX295 | — | — | — | — | — | 0.8 | 1 |
| ZISNET F | 0.8 | 0.8 | 0.8 | 0.8 | 0.8 | 0.8 | 0.8 |
| NOCCELER BZ | — | — | — | — | 1 | 2 | 2 |
| NOCCELER TBT-N | 3 | 3 | 3 | 3 | 2 | — | — |
| DHT-4A-2 | 2 | — | — | — | — | 1 | 1 |
| DHT-4C | — | — | — | — | — | — | — |
| DHT-4A | — | 2 | — | 2 | — | — | — |
| ALCAMIZER 4-2 | — | — | 2 | — | 2 | — | — |
| KS-41A-5 | — | — | — | — | — | — | — |
| KS-20 | — | — | — | 1 | — | — | — |
| SCONOC 5 | 0.7 | 0.7 | 0.7 | 0.7 | 0.7 | 0.7 | 0.7 |
| o-Phthalic acid | — | — | — | — | — | — | — |
| NIPSIL VN3 | — | 20 | 20 | 20 | 20 | 20 | 20 |
| TOKUSIL GU | — | — | — | — | — | — | — |
| CARPLEX 1120 | — | — | — | — | — | — | — |
| SATINTON No. 5 | 60 | 60 | 60 | 60 | 60 | 60 | 60 |
| TRANSLINK 555 | — | — | — | — | — | — | — |
| NULOK 321 | 20 | — | — | — | — | — | — |
| TSL8350 | — | — | — | — | — | 1 | 1 |
| TSL8320 | — | — | — | — | — | — | — |
| TSL8370 | — | — | — | — | — | — | — |
| TSL8380 | 1 | 1 | 1 | 1 | 1 | — | — |
| Stearic acid | 1 | 1 | 1 | 1 | 1 | 1 | 1 |
| NOCRAC CD | 2 | 2 | 2 | 2 | 2 | 2 | 2 |
| MgO #150 | — | — | — | — | — | — | — |
| SULFAX A | — | — | — | — | — | — | — |
| NONSOUL SN-1 | — | — | — | — | — | — | — |
| NONSOUL SK-1 | — | — | — | — | — | — | — |
| Non-crosslinked product | | | | | | | |
| Mooney scorching test t5 (min) | 6.5 | 8.5 | 8.5 | 8.7 | 7.5 | 10.2 | 10 |
| Storage stability test (%) | 8 | 2 | 1 | 2 | 6 | 12 | 11 |
| Cure rate test t'c (90) (min) | 5.5 | 7.3 | 7.5 | 7.5 | 7.1 | 8.3 | 8 |
| Crosslinked product | | | | | | | |
| Tensile test | | | | | | | |
| Tensile strength (Mpa) | 12 | 11.8 | 12.1 | 11.8 | 12 | 10.7 | 10.8 |
| Elongation (%) | 190 | 200 | 190 | 210 | 190 | 240 | 240 |
| Hardness (JIS-A) | 75 | 74 | 75 | 73 | 74 | 73 | 73 |
| Permanent compression set | | | | | | | |
| 150° C. × 70 Hrs (%) | 32 | 33 | 25 | 30 | 28 | 46 | 46 |
| 175° C. × 70 Hrs (%) | 48 | 49 | 40 | 45 | 42 | 59 | 60 |
| Water resistance test | | | | | | | |
| CH (point) | −15 | −15 | −13 | −12 | −15 | −18 | −18 |
| Δ V (%) | 26 | 26 | 24 | 24 | 25 | 29 | 28 |
| Metal corrosion test | ⊚ | ⊚ | ⊚ | ⊚ | ⊚ | ⊚ | ⊚ |
| Meal contamination test | ⊚ | ⊚ | ⊚ | ⊚ | ⊚ | ⊚ | ⊚ |

TABLE 3

| | Comparative Example | | | | | | |
|---|---|---|---|---|---|---|---|
| | 1 | 2 | 3 | 4 | 5 | 6 | 7 |
| Components | | | | | | | |
| JSR AREX117 | 100 | 100 | 100 | 100 | 100 | 100 | 100 |
| JSR AREX295 | — | — | — | — | — | — | — |
| ZISNET F | 0.8 | — | 0.8 | 0.8 | 0.8 | 0.8 | 0.8 |
| NOCCELER BZ | 2 | — | 2 | 2 | — | — | 2 |
| NOCCELER TBT-N | — | — | — | — | 2 | 2 | — |
| DHT-4A-2 | — | — | 1 | — | 2 | — | 1 |
| DHT-4C | — | — | — | — | 1 | — | — |
| DHT-4A | — | — | — | — | — | — | — |
| ALCAMIZER 4-2 | — | — | — | — | — | — | — |
| KS-41A-5 | — | — | — | — | 0.3 | — | — |
| KS-20 | — | — | — | — | — | — | — |
| SCONOC 5 | — | — | 0.5 | — | — | — | — |
| o-Phthalic acid | — | — | — | 0.5 | — | 0.2 | 0.7 |
| NIPSIL VN3 | 20 | — | — | 20 | 20 | — | 20 |
| TOKUSIL GU | — | — | — | — | — | 20 | — |
| CARPLEX 1120 | — | 20 | 20 | — | — | — | — |
| SATINTON No. 5 | 60 | 60 | 60 | 60 | 60 | 60 | 60 |
| TRANSLINK 555 | — | — | — | — | — | — | — |
| NULOK 321 | — | — | — | — | — | — | — |
| TSL8350 | 1 | 1 | 1 | — | — | — | — |
| TSL8320 | — | — | — | 1 | — | — | — |
| TSL8370 | — | — | — | — | 1 | — | — |
| TSL8380 | — | — | — | — | — | 1 | — |
| Stearic acid | 1 | 1 | 1 | 1 | 1 | 1 | 1 |
| NOCRAC CD | 2 | 2 | 2 | 2 | 2 | 2 | 2 |
| MgO #150 | — | — | — | 2 | — | — | — |
| SULFAX A | — | 0.3 | — | — | — | — | — |
| NONSOUL SN-1 | — | 2.5 | — | — | — | — | — |
| NONSOUL SK-1 | — | 0.5 | — | — | — | — | — |
| Non-crosslinked product | | | | | | | |
| Mooney scorching test t5 (min) | 6.0 | 3.7 | * | 9.5 | 4.5 | 11.1 | 9.3 |
| Storage stability test (%) | 38 | 75 | — | 45 | 95 | 3 | 8 |
| Cure rate test t'c (90) (min) | 13.6 | 13.9 | — | 10.1 | 5.8 | 8.9 | 8.5 |
| Crosslinked product | | | | | | | |
| Tensile test | | | | | | | |
| Tensile strength (Mpa) | 11.5 | 11.4 | — | 11.6 | 11.4 | 10.5 | 7.5 |
| Elongation (%) | 230 | 160 | — | 240 | 200 | 260 | 300 |
| Hardness (JIS-A) | 73 | 68 | — | 72 | 75 | 70 | 65 |
| Permanent compression set | | | | | | | |
| 150° C. × 70 Hrs (%) | 40 | 58 | — | 46 | 40 | 62 | 70 |
| 175° C. × 70 Hrs (%) | 58 | 75 | — | 66 | 57 | 76 | 85 |
| Water resistance test | | | | | | | |
| CH (point) | −18 | −37 | — | −17 | −16 | −19 | −30 |
| Δ V (%) | 24 | 93 | — | 26 | 24 | 28 | 45 |
| Metal corrosion test | Δ | ⊚ | — | ○ | ⊚ | X | ⊚ |
| Meal contamination test | X | ○ | — | X | ⊚ | ⊚ | ⊚ |

The crosslinkable acrylic rubber composition of the present invention exhibits superior balance between the storage stability and cure rate, and has only minimal risk of corroding metals or being contaminated by metals. In addition, the cured products made by crosslinking the composition have excellent tensile strength, permanent compression set, and water resistance. This composition has thus a high characteristic balance as a crosslinkable acrylic rubber composition.

Obviously, numerous modifications and variations of the present invention are possible in light of the above teachings. It is therefore to be understood that, within the scope of the appended claims, the invention may be practiced otherwise than as specifically described herein.

What is claimed is:

1. A crosslinkable acrylic rubber composition which comprises,
   (1) a halogen-containing acrylic rubber,
   (2) a triazine thiol compound,
   (3) a dithiocarbamine acid derivative or a thiuram sulfide compound, or both,
   (4) a hydrotalcite compound or an organotin compound, or both,
   (5) an aromatic carboxylic acid compound or an acid anhydride thereof, or both,
   (6) a white filler with a pH of 2–10, and
   (7) a silane coupling agent.

2. The crosslinkable acrylic rubber composition according to claim 1, containing 0.05–5 parts by weight of component (2), 0.1 to 10 parts by weight of component (3), 0.1–10 parts by weight of component (4), 0.05–5 parts by weight of component (5), 20–200 parts by weight of component (6), and 0.1–10 parts by weight of component (7) for 100 parts by weight of component (1).

3. The composition of claim 1, wherein said component (6) is a white filler having a pH of 3–8.

4. A crosslinkable acrylic rubber composition containing components (1)–(8) which is prepared by blending:
   (A) a mixture prepared by blending (8) an acrylate polymer, other than a crosslinking group containing acrylic rubber, containing alkyl acrylate or alkoxyalkyl acrylate, or both, as major components and either or both of (2) a triazine thiol compound and (4) a hydrotalcite compound or an organotin compound, or both,
   (B) (1) a halogen-containing acrylic rubber, (3) a dithiocarbamine acid derivative or a thiuram sulfide compound, or both, (5) an aromatic carboxylic acid compound or an acid anhydride thereof, or both, (6) a white filler with a pH of 2–10, and (7) a silane coupling agent, and
   (C) any remaining balance of the above component (2) or component (4), is not blended in the above mixture (A).

5. The crosslinkable acrylic rubber composition according to claim 4, containing the component (8) in an amount of 0.1–10 parts by weight for 100 parts by weight of component.

6. The crosslinkable acrylic rubber composition according to claim 4, wherein the mixture (A) comprises 10–60 wt % of component (8), 10–80 wt % of component (2), and 10–80 wt % of component (4), provided that the total of the acrylate polymer (8), component (2), and component (4) is 100 wt %.

7. The crosslinkable acrylic rubber composition according to claim 4, wherein the mixture (A) comprises 10–80 wt % of component (8) and 20–90 wt % of the component (2).

8. The crosslinkable acrylic rubber composition according to claim 3, wherein the mixture (A) comprises 10–80 wt % of component (8) and 20–90 wt % of the component (4).

* * * * *

UNITED STATES PATENT AND TRADEMARK OFFICE
CERTIFICATE OF CORRECTION

PATENT NO. : 5,965,640
DATED : October 12, 1999
INVENTOR(S) : Nobutoshi KOBAYASHI et al It is certified that error appears in the above-identified patent and that said Letters Patent is hereby corrected as shown below:

Column 18, lines 14-15, "component"- - should read --component (1).--

Signed and Sealed this

Sixth Day of June, 2000

*Attest:*

Q. TODD DICKINSON

*Attesting Officer*   *Director of Patents and Trademarks*